May 23, 1967 G. A. GILLBERG 3,320,825
VALVE ACTUATOR AND RETAINING MEANS
Filed May 24, 1965
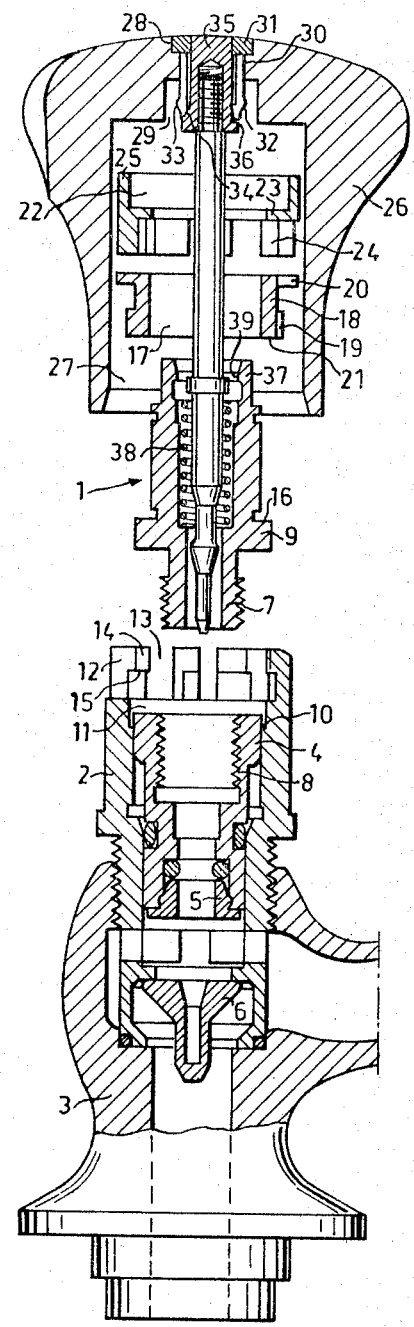
INVENTOR.
Gunnar Arne Gillberg
BY
Pierce, Scheffler & Parker
Attorneys United States Patent Office 3,320,825
Patented May 23, 1967

3,320,825
VALVE ACTUATOR AND RETAINING MEANS
Gunnar Arne Gillberg, Herserudsvagen 14,
Lidingo, Sweden
Filed May 24, 1965, Ser. No. 458,231
Claims priority, application Sweden, June 5, 1964,
6,904/64
6 Claims. (Cl. 74—548)

The present invention concerns a device axially undisplaceable but turnable to connect a first member with a second member, the first of said members being provided with a radial flange abutting against a radial shoulder of the second member.

The intention of the invention is to provide a device of the type stated, which ensures that the connection cannot be unintentionally loosened, the connection, however, being easily loosened by hand without the aid of any tools.

According to the invention this is mainly accomplished partly by (a) circumferentially spaced, axial projections arranged on the second member, said projections extending past the top surface of the radial flange of said first member and being provided with radially extending lubs (b) partly by a detention ring with teeth facing the lugs, which can be introduced between, and can be made to mesh with, the radial lugs of said second member, and (c) partly by a locking ring with axial dogs which are inserted between the projections and lugs of said second member to prevent turning movement of said member relative to said detention ring.

In the following the invention will be described in detail with reference to the accompanying drawing which shows the object of invention used in a water tap. This scope of the application must, however, only be regarded as an example without limiting effect.

The drawing is an exploded view in axial section of the water tap, the sectional planes at both sides of the central line forming an angle with each other so that the inventive concept will be clearer.

In the following the construction of the tap will first be shortly mentioned, whereafter the object of invention will be fully described.

As already stated, the invention is intended to provide an axially undisplaceable but turnable connection between two members, said connection being such that it is impossible to break the connection unintentionally but easy to loosen the connection intentionally by hand and without the aid of any tools.

In the example as shown the one member consists of an actuating screw 1 for axial displacement of a valve member, and the other member consists of a valve casing 2 cooperating with said valve member. Said second member of valve casing 2 is screwed into a tap casing 3 and thus is stationary. Sealing means are in known manner inserted between said tap casing 3 and said valve casing 2 and the latter is provided with a throughflow passage connecting an inlet to the top casing with a spout thereof, said throughflow passage being closeable with the aid of the valve member 4 which is axially displaceable but unturnably arranged in the valve casing and in known manner is provided with a tap packing 5 by aid of which said throughflow pasage is sealingly closed. The water tap as shown is furthermore provided with an auxiliary valve member 6 which also sealingly closes said throughflow passage when said tap is dismantled so that repacking can be undertaken without the water supply to the inlet of the tap having to be interrupted. This does, however, not form any particular feature of the present invention and will therefore not be described in detail.

As already stated, the axial displacement of said valve member 4 is accomplished by the aid of said actuating screw 1, one end 7 of which is provided with male screw threads meshing with female screw threads 8 of the valve member. If thereby the actuating screw 1 is axially undisplaceably but turnably connected to the valve casing 2, turning movement of the actuating screw 1 will result in an axial displacement of the valve member 4 to control the water flow through the tap and the invention is specially concerned with a device providing such a connection.

To accomplish this the actuating screw 1 is provided with a radial flange 9 one end face of which in assembled condition abuts against a radial shoulder 10 in a central bore 11 of the valve casing 2. Thus, the actuating screw 1 is axially fixed in one direction relative to said valve casing 2 and turnable relative to the same.

A number of, for instance six, axial projections 12 are arranged at the outer edge of said valve casing 2, which are equally spaced around said edge and separated by rectangular notches 13. In the drawing the sectional plane to the left of the central line passes through one such notch and the sectional plane to the right of said central line passes through one of the projections 12. The top end of each projection 12 carries a lug 14, the border surface 15 of which facing the valve casing is positioned at a greater distance from said shoulder 10 than the thickness of said radial flange 9 of the actuating screw 1. Thus, when said actuating screw 1 is inserted into the valve casing 2 with the flange 9 thereof in abutment against said shoulder 10, there will remain a free space between the opposing surface of said flange 9 and above mentioned border surfaces 15 of said lugs 14.

The device according to the invention also includes a detention ring 17 consisting of a tubular web 18 with an inner diameter large enough to surround the actuating screw 1 and an outer diameter small enough to be inserted into the bore 11 of the valve casing 2. At one end of the tubular web 18 there are arranged the same number of radially outwardly extending lugs 19, as there are notches 13 between said projections 12 of the valve casing 2. Said external lugs 19 have such an axial extension and such a radial height that they can be inserted with suitable play into said spaces between the flange surface 16 and the border surface 15 of said lugs 14. A number of radially extending teeth 20 are arranged at the other end of said tubular detention web 18 said teeth 20 being axially aligned with the lugs 19. The opposing faces of the teeth 20 and the lugs 19 are positioned at such a distance from each other that the internal lugs 14 of the valve casing 2 can be brought into engagement therebetween. The end face 21 of the detention ring 17 facing the valve casing 2 is plane and intended to abut against the flange surface 16 of the actuating screw 1.

Thus, when the actuating screw 1, with the valve member 4 screwed onto the end 7 thereof, is inserted into the valve casing 2 until its radial flange 9 rests against the shoulder 10 and the detention ring 17 thereafter is placed around the actuating screw 1 with the lugs 19 inserted into the notches 13, so that the end surface 21 of said detention ring 17 abuts against the flange surface 16 of the actuating screw 1 and said detention ring 17 thereafter is turned one tooth or lug pitch, the inwardly directed lugs 14 of the valve casing 2 will be situated between the outwardly directed lugs 19 and the teeth 20 of the detention ring 17. Thereby the flange 9 of the actuating screw 1 will be positioned between two fixed abutment surfaces, viz. the shoulder 10 in the valve casing 2 and the end surface 21 of the detention ring 17.

To prevent unintentional turning movement of the detention ring 17, by which the above mentioned connection could be loosened, the device according to the invention also comprises a locking ring 22.

Said locking ring 22 consists of a circular disc 23, the edge of which is provided with the same number of axially extending dogs 24 as there are notches 13 between the projections 12 of the valve casing 2. The diameter of the disc preferably corresponds with the diameter of the detention ring 17, measured across the radial teeth 20 of same, and it is provided with a central opening through which the actuating screw 1 extends. The locking ring 22 is placed coaxially over the detention ring 17 with the axial dogs 24 inserted into said notches 13 and thus between the teeth 20 of the detention ring 17. The dogs 24 thereby prevent turning of the detention ring 17 relative to the valve casing 2 and thus locks the device against unintentional loosening.

On the side opposing said dogs 24 the edge of the disc 23 is preferably provided with an axial flange 25 which in assembled position abuts against a stop device preventing axial displacement of the locking ring 22. The actuating screw 1 is also preferably provided with a groove for a circlip limiting the axial movement of the locking ring relative to the actuating screw, so that the dogs 24 are not brought out of engagement with the teeth 20 of the detention ring 17.

In the embodiment shown said axial displacement is prevented by aid of the handle 26 of the tap. Said handle is formed like a cap with a central, cylindrical cavity 27 which encloses the valve mechanism and the lower end of which surrounds the top edge of the tap casing 3. In the top surface the handle 26 is provided with a circular, central bore 28 and in the bottom of the cavity 27 there is a corresponding non-circular counterbore 29, said two counter bores being connected by a central passage 30 with decreased diameter. The counter bore 28 in the top surface of the handle 26 encloses a ring 31, the lower edge of which is provided with a number of elastic tongues 32 separated by slots. Said tongues 32 form together a slotted tube, extending through said connecting passage 30 into the counter bore 29 in the bottom of said cavity 27 and having an inner diameter somewhat larger than that of the ring 31. The free ends of the tongues 32 extending into said counter bore 29 are each provided with an external bead 33 and an internal chamfer 34.

A stud 35 is axially movable in said ring 31 and the tube formed by said tongues 32 and at the end thereof reaching into said counter bore 29 it is provided with a chamfered enlargement 36 cooperating with the internal chamfer 34 of said tongues 32.

The top end 37 of said actuating screw 1 is non-circular and fits with some play into the non-circular counter bore 29 so that the actuating screw 1 is turned together with said handle 26. A central bore 38 is provided in the actuating screw 1 and an internal, annular bead 39 is arranged at the top end of said bore, underneath which the beads 33 of said tongues 32 can engage.

By aid of the device described above the handle 26 can easily be mounted in effective engagement with said actuating screw 1, by pressing the stud 35 downwardly, for instance with a finger nail, so that the enlargement 36 of the stud is removed from the free ends of the tongues 32. As the diameter of the tube formed by said tongues 32 is somewhat larger than the outer diameter of said stud 35, the tongues 32 are resiliently displaced outwardly so that the beads 33 thereof can be brought into engagement beneath the cooperating bead 39 of the actuating screw, when said counter bore 29 is applied around the non-circular end 37 of said actuating screw 1. Thereafter said stud 35 is released to be pressed axially upwards, for instance by aid of a spring, so that the chamfered enlargement 36 thereof is pressed against the chamfers 34 of said tongues 32 preventing inward displacement of the same, and thus the handle 26 is retained on said actuating screw 1. The axial flange 25 of said locking ring 22 is preferably of such a height that the edge of same in assembled position is situated close to the bottom of the cavity 27 so that said locking ring becomes axially undisplaceable.

The described device fulfills the intentions stated in the foregoing and a reliable connection, which is easy to disassemble, is provided between the members. Perhaps it is best to repeat that the described water tap only is one example of the application of the invention and the embodiment described in detail can also be modified in many ways without departing from the concepts stated in the accompanying claims.

What I claim is:

1. A device comprising an axially undisplaceable but turnable connection between a first member and a second member, said first member having a radial flange, one end surface of which abuts against a radial shoulder of said second member which second member is provided with spaced, axial projections extending past the other end surface of said radial flange and being provided with radially extending lugs; a detention ring having radial lugs extending below the radial lugs of said second member and meshing between said lugs of said second member and said other end surface of said radial flange; a locking ring having axial dogs inserted between the projections and lugs of said second member and between teeth on said detention ring to prevent turning movement of said member relative to said detention ring, and means for preventing axial movement of said locking ring.

2. The device defined in claim 1, in which the axial dogs of said locking ring are of such a length as to reach in between the radial lugs of said detention ring and the axial projections of said second member, axial movement of said locking ring being prevented by aid of detachable means.

3. A device comprising an axially undisplaceable but turnable connection between a first member and a second member, said first member having a radial flange, one end surface of which abuts against a radial shoulder of said second member, which second member is provided with spaced axial projections extending past the other end surface of said flange and being provided with radially extending lugs; a detention ring having radial lugs extending below the radial lugs of said second member and meshing between said lugs and said other end surface of the flange, said detention ring, at the end thereof remote from said lugs, furthermore being provided with radial teeth, aligned with said lugs at a distance therefrom to accommodate the radial lugs of said second member; a locking ring having axial dogs extending between the projections and lugs of said second element and between the lugs and teeth of said detention ring to prevent turning movement of said second member relative to said detention ring, axial movement of said locking ring being prevented by aid of detachable means.

4. A device comprising an axially undisplaceable but turnable connection between two members of a water tap, wherein the first member consists of an actuating screw for a top valve member and the second member consists of a valve casing cooperating therewith, said actuating screw having a radial flange, one end surface of which abuts against a radial shoulder of said valve casing, said valve casing furthermore being provided with spaced axial projections extending past the other end surface of said radial flange and being provided with radially extending lugs, a detention ring having lugs facing in opposite direction to the lugs on said axial projections and extending below said radial lugs of said valve casing and meshing between same and said other end surface of said flange, said detention ring at the end thereof remote from said lugs furthermore being provided with radial teeth aligned with said lugs and positioned at a distance therefrom to accommodate said radial lugs of said valve casing; a locking ring having axial dogs extending therefrom and inserted between the projections and lugs of said valve casing and between said teeth of said detention ring to prevent turning movement of said valve casing relative to said detention ring, said valve casing and said actuating screw being accommodated in an axial recess in a handle of said water tap, the bottom surface of said recess being positioned close by the free edge of said locking ring in order to prevent axial displacement of same.

5. A device comprising an axially undisplaceable but turnable connection between two members of a water tap, wherein the first member consists of an actuating screw for a valve member and the second member consists of the valve casing cooperating therewith, said actuating screw having a radial flange, one end surface of which abuts against a radial shoulder of said valve casing, said valve casing furthermore being provided with spaced, axial projections extending past the other end surface of said radial flange and being provided with radially extending lugs, a detention ring having lugs facing in opposite direction to the lugs on said axial projections and extending below said radial lugs of said valve casing and meshing between same and said other surface of said flange, said detention ring, at the end thereof remote from said lugs, furthermore being provided with radial teeth aligned with said lugs and positioned at such a distance therefrom to accommodate said radial lugs of said valve casing; a locking ring having axial dogs extending between the projections and lugs of said valve casing and between said teeth of said detention ring to prevent turning movement of said valve casing relative to said detention ring, said valve casing and said actuating screw being accommodated in a recess in a handle of said water tap, a central bore extending through the end surface of said handle to the recess, said bore housing a number of tongues which resiliently engage said actuating screw in order to hold the bottom surface of said recess adjacent to the free end of said locking ring so as to prevent axial displacement of same.

6. A device comprising an axially undisplaceable but turnable connection between two members as claimed in claim 5 including a stud between said tongues, said stud being provided with an enlargement which by aid of resilient means biasing said stud is pressed into abutment with said tongues to prevent resilient movement of same.

References Cited by the Examiner
UNITED STATES PATENTS

| 2,285,223 | 6/1942 | Mueller | 74—548 |
| 3,210,040 | 10/1965 | Thurlow | 74—548 X |

MILTON KAUFMAN, *Primary Examiner.*

UNITED STATES PATENT OFFICE
CERTIFICATE OF CORRECTION

Patent No. 3,320,825                                                May 23, 1967

Gunnar Arne Gillberg

It is hereby certified that error appears in the above numbered patent requiring correction and that the said Letters Patent should read as corrected below.

Column 4, line 58, for "top" read -- tap --.

Signed and sealed this 21st day of November 1967.

(SEAL)
Attest:

Edward M. Fletcher, Jr.                                      EDWARD J. BRENNER
Attesting Officer                                                Commissioner of Patents